(12) United States Patent
Nodzak et al.

(10) Patent No.: US 12,375,363 B2
(45) Date of Patent: Jul. 29, 2025

(54) SYSTEM AND METHOD FOR RECONSTRUCTING TIME AWARE DATA ACTIVITY ACROSS MULTIPLE SOFTWARE APPLICATIONS (71) Applicant: BANK OF AMERICA CORPORATION, Charlotte, NC (US)

(72) Inventors: Conor Mitchell Liam Nodzak, Charlotte, NC (US); Kyle S. Sorensen, Huntersville, NC (US); Brian C. Busch, Charlotte, NC (US); Fernando A. Maisonett, Charlotte, NC (US); Shreyas Srinivas, Charlotte, NC (US); Angela Dawn Roose, Mooresville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/992,840

(22) Filed: Nov. 22, 2022

(65) Prior Publication Data
US 2024/0171473 A1    May 23, 2024

(51) Int. Cl.
*H04L 41/147* (2022.01)
*H04L 43/106* (2022.01)

(52) U.S. Cl.
CPC .......... *H04L 41/147* (2013.01); *H04L 43/106* (2013.01)

(58) Field of Classification Search
CPC ............................ H04L 41/147; H04L 43/106
See application file for complete search history.

(56) References Cited

U.S. PATENT DOCUMENTS

| | | | |
|---|---|---|---|
| 8,989,046 B1 * | 3/2015 | Train | H04L 45/033 370/254 |
| 9,344,906 B2 | 5/2016 | Morrill | |
| 9,473,990 B2 | 10/2016 | Szymanski | |
| 9,621,442 B2 | 4/2017 | Lee | |
| 9,763,167 B2 | 9/2017 | Gopal | |
| 9,813,315 B2 | 11/2017 | Schultz | |
| 9,813,320 B2 | 11/2017 | Edwards | |
| 9,979,619 B2 | 5/2018 | Vasseur | |
| 10,003,605 B2 | 6/2018 | Muddu | |
| 10,218,602 B2 | 2/2019 | Levy-Abegnoli | |
| 10,256,939 B2 | 4/2019 | Zhang | |

(Continued)

*Primary Examiner* — Kamal B Divecha
*Assistant Examiner* — Eui H Kim
(74) *Attorney, Agent, or Firm* — Moore & Van Allen PLLC; Nicholas C. Russell (57) ABSTRACT

Systems, computer program products, and methods are described herein for reconstructing time aware data activity across multiple software applications. The method includes receiving one or more node communication data packets. Each of the one or more node communication data packets are time-stamped and include two nodes of a plurality of nodes within a network. The method also includes generating a first time period path graph. The first time period path graph includes a directional data flow between the plurality of nodes during a first time period. The first time period path graph is generated based on the one or more node communication data packets. The method further includes determining a central node of the plurality of nodes for the first time period. The central node of the plurality of nodes is determined based on the first time period path graph.

20 Claims, 5 Drawing Sheets

(56) References Cited

U.S. PATENT DOCUMENTS

| | | | |
|---|---|---|---|
| 10,326,672 B2* | 6/2019 | Scheib | H04L 47/32 |
| 10,341,237 B2 | 7/2019 | Averi | |
| 10,530,796 B2 | 1/2020 | Patterson | |
| 10,547,537 B1 | 1/2020 | Wood | |
| 10,681,608 B2 | 6/2020 | Hui | |
| 10,700,958 B2 | 6/2020 | Flamini | |
| 10,715,414 B2 | 7/2020 | May | |
| 10,756,983 B2 | 8/2020 | Ratkovic | |
| 10,771,488 B2 | 9/2020 | Verma | |
| 10,805,185 B2 | 10/2020 | Kolar | |
| 2014/0025840 A1* | 1/2014 | Dalmia | H04L 41/142 |
| | | | 709/232 |
| 2015/0324482 A1* | 11/2015 | Kato | H04L 41/22 |
| | | | 707/798 |
| 2017/0026270 A1* | 1/2017 | Handige Shankar | H04L 43/04 |
| 2017/0180221 A1* | 6/2017 | Appel | H04L 43/067 |
| 2019/0319844 A1* | 10/2019 | Ding | H04L 41/50 |
| 2020/0162264 A1 | 5/2020 | Zamani | |
| 2020/0169483 A1* | 5/2020 | Kursun | G06Q 20/3678 |
| 2020/0220892 A1* | 7/2020 | Gibson | H04L 63/1441 |
| 2021/0320854 A1* | 10/2021 | King, V | H04L 43/0852 |
| 2023/0327969 A1* | 10/2023 | Saravanan | G06N 10/60 |
| | | | 706/14 |

* cited by examiner

SYSTEM AND METHOD FOR RECONSTRUCTING TIME AWARE DATA ACTIVITY ACROSS MULTIPLE SOFTWARE APPLICATIONS

TECHNOLOGICAL FIELD

Example embodiments of the present disclosure relate generally to reconstructing time aware data activity and, more particularly, to reconstructing time aware data activity across multiple software applications.

BACKGROUND

Data traffic between network nodes is often documented and mapped. However, these maps often are compilations of many network communications over an extended period of time, resulting in little utility in the compiled data. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for reconstructing time aware data activity across multiple software applications is provided. The system includes at least one non-transitory storage device and at least one processing device coupled to the at least one non-transitory storage device. The at least one processing device is configured to receive one or more node communication data packets. Each of the one or more node communication data packets are time-stamped and include two nodes of a plurality of nodes within a network. The at least one processing device is also configured to generate a first time period path graph. The first time period path graph includes a directional data flow between the plurality of nodes during a first time period. The first time period path graph is generated based on the one or more node communication data packets. The at least one processing device is further configured to determine a central node of the plurality of nodes for the first time period. The central node of the plurality of nodes is determined based on the first time period path graph.

In some embodiments, the central node of the plurality of nodes for the first time period is based on a temporal centrality of each of the plurality of nodes. In some embodiments, the at least one processing device is configured to determine the temporal centrality of each of the plurality of nodes and the temporal centrality is based on the one or more node communication data packet.

In some embodiments, the at least one processing device is configured to generate a second time period path graph. In such an embodiment, the second time period path graph includes a directional data flow between the plurality of nodes during a second time period, the second time period is after the first time period, and the second time period path graph is generated based on the one or more node communication data packets.

In some embodiments, the at least one processing device is configured to verify a communication pathway by comparing a communication along the communication pathway during the first time period to the first time period path graph.

In some embodiments, the at least one processing device is configured to generate a dynamic time aware path graph based on the first time period path graph and the second time period path graph. In some embodiments, the dynamic time aware path graph based on the first time period path graph and the second time period path graph comprises representation of communication between at least two of the plurality of nodes during the first time period and the second time period.

In another example embodiment, a computer program product for reconstructing time aware data activity across multiple software applications is provided. The computer program product includes at least one non-transitory computer-readable medium having computer-readable program code portions embodied therein. The computer-readable program code portions include an executable portion configured to receive one or more node communication data packets. Each of the one or more node communication data packets are time-stamped and include two nodes of a plurality of nodes within a network. The computer-readable program code portions also include an executable portion configured to generate a first time period path graph. The first time period path graph includes a directional data flow between the plurality of nodes during a first time period. The first time period path graph is generated based on the one or more node communication data packets. The computer-readable program code portions further include an executable portion configured to determine a central node of the plurality of nodes for the first time period. The central node of the plurality of nodes is determined based on the first time period path graph.

In some embodiments, the central node of the plurality of nodes for the first time period is based on a temporal centrality of each of the plurality of nodes. In various embodiments, the computer program product further includes an executable portion configured to determine the temporal centrality of each of the plurality of nodes and the temporal centrality is based on the one or more node communication data packet.

In various embodiments, the computer program product further includes an executable portion configured to generate a second time period path graph. In such an embodiment, the second time period path graph includes a directional data flow between the plurality of nodes during a second time period, the second time period is after the first time period, and the second time period path graph is generated based on the one or more node communication data packets.

In various embodiments, the computer program product further includes an executable portion configured to verify a communication pathway by comparing a communication along the communication pathway during the first time period to the first time period path graph.

In various embodiments, the computer program product further includes an executable portion configured to generate a dynamic time aware path graph based on the first time period path graph and the second time period path graph.

In various embodiments, the dynamic time aware path graph based on the first time period path graph and the second time period path graph includes representation of communication between at least two of the plurality of nodes during the first time period and the second time period.

In still another example embodiment, a computer-implemented method for reconstructing time aware data activity across multiple software applications is provided. The method includes receiving one or more node communication data packets. Each of the one or more node communication data packets are time-stamped and include two nodes of a plurality of nodes within a network. The method also includes generating a first time period path graph. The first time period path graph includes a directional data flow between the plurality of nodes during a first time period and the first time period path graph is generated based on the one or more node communication data packets. The method further includes determining a central node of the plurality of nodes for the first time period. The central node of the plurality of nodes is determined based on the first time period path graph.

In various embodiments, the central node of the plurality of nodes for the first time period is based on a temporal centrality of each of the plurality of nodes. In various embodiments, the method also includes determining the temporal centrality of each of the plurality of nodes and the temporal centrality is based on the one or more node communication data packet.

In various embodiments, the method also includes generating a second time period path graph. In such an embodiment, the second time period path graph includes a directional data flow between the plurality of nodes during a second time period, the second time period is after the first time period, and the second time period path graph is generated based on the one or more node communication data packets.

In various embodiments, the method also includes verifying a communication pathway by comparing a communication along the communication pathway during the first time period to the first time period path graph.

In various embodiments, the method also includes generating a dynamic time aware path graph based on the first time period path graph and the second time period path graph.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Maintenance of enterprise data lineage has historically been problematic to execute at scale and it is often not feasible to ensure a high degree of accuracy over time. Large scale data lineage is difficult due to data compilation being non-time aware resulting in graphs that provide little to no utility, due to the lack of time relevance. As such, data lineage is instead a time-consuming manual process that requires heavy post-hoc data reconstruction that is time consuming and expensive.

Various embodiments of the present disclosure allow for a reconstruction of time aware data activity across multiple software applications. The system creates a time period path graph for each of a plurality of time periods. Each of the time period path graphs include the directional flow during the given time period allowing for the individual node flow to be analyzed at a given instance in time. The temporal centrality can be compiled for each of the nodes in the network at a given time period and compared to other nodes to determine a central node. Additionally, each communication pathway may be compared by adding the temporal centrality of each node along the path.

The present disclosure provides a solution to issues with tracing data lineage. Namely, the time-aware graphs produced by various embodiment allow for faster data lineage review and reconstruction, such that the application communication can be improved by creating an analysis that can rank relative importance of given communication pathways.

Figure 1A:
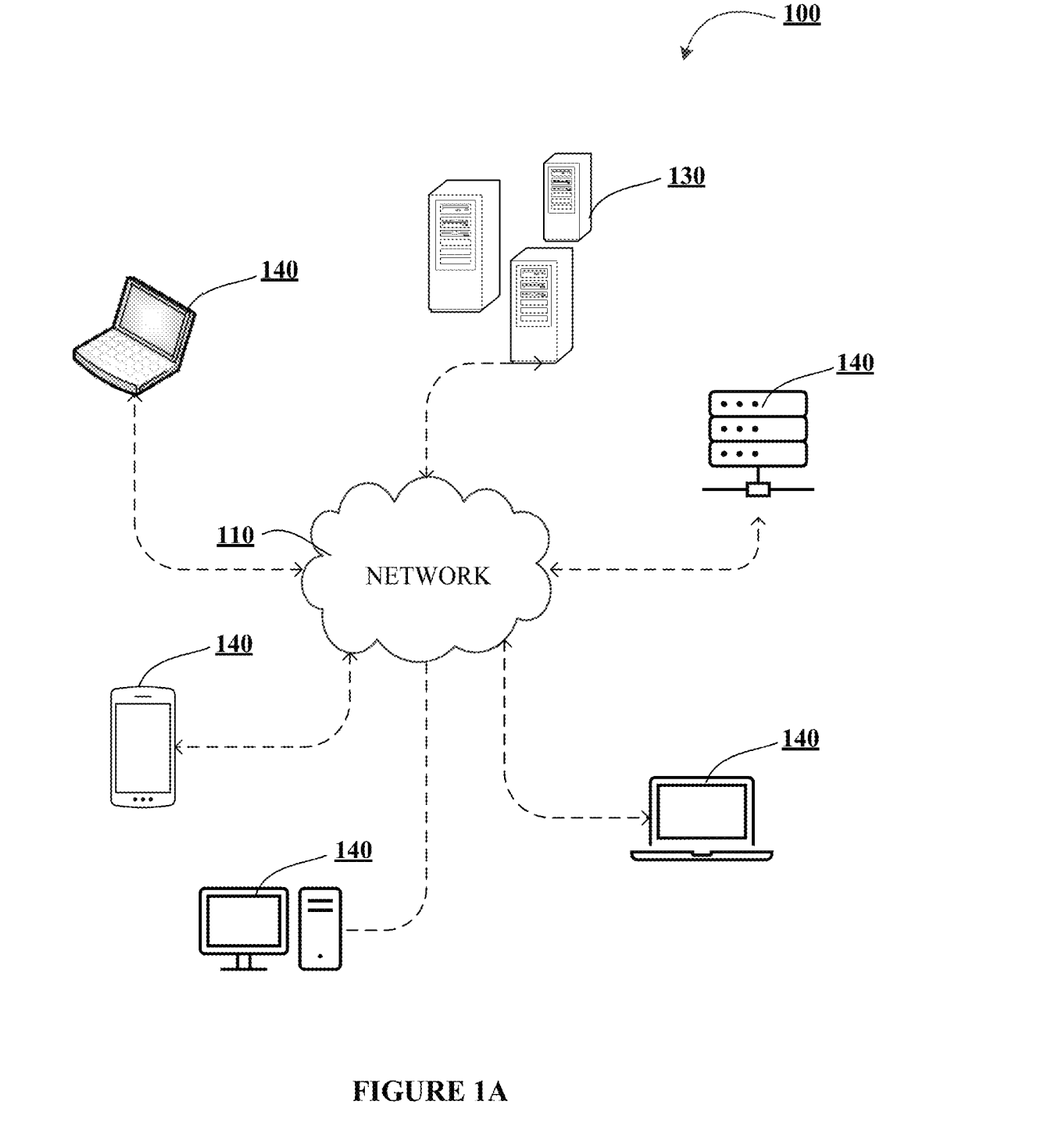
FIGS. 1A-1C illustrates technical components of an exemplary distributed computing environment for reconstructing time aware data activity across multiple software applications, in accordance with various embodiments of the present disclosure.
Figure 1B:
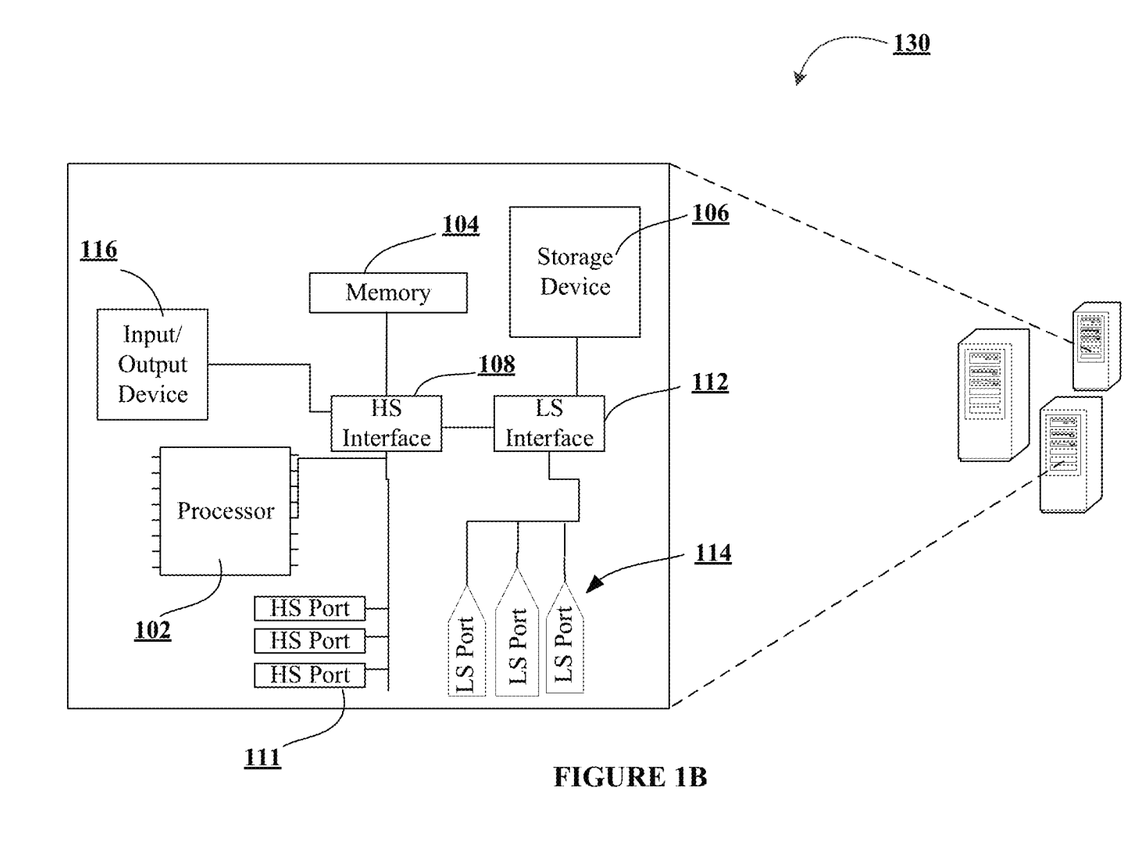
Figure 1C:
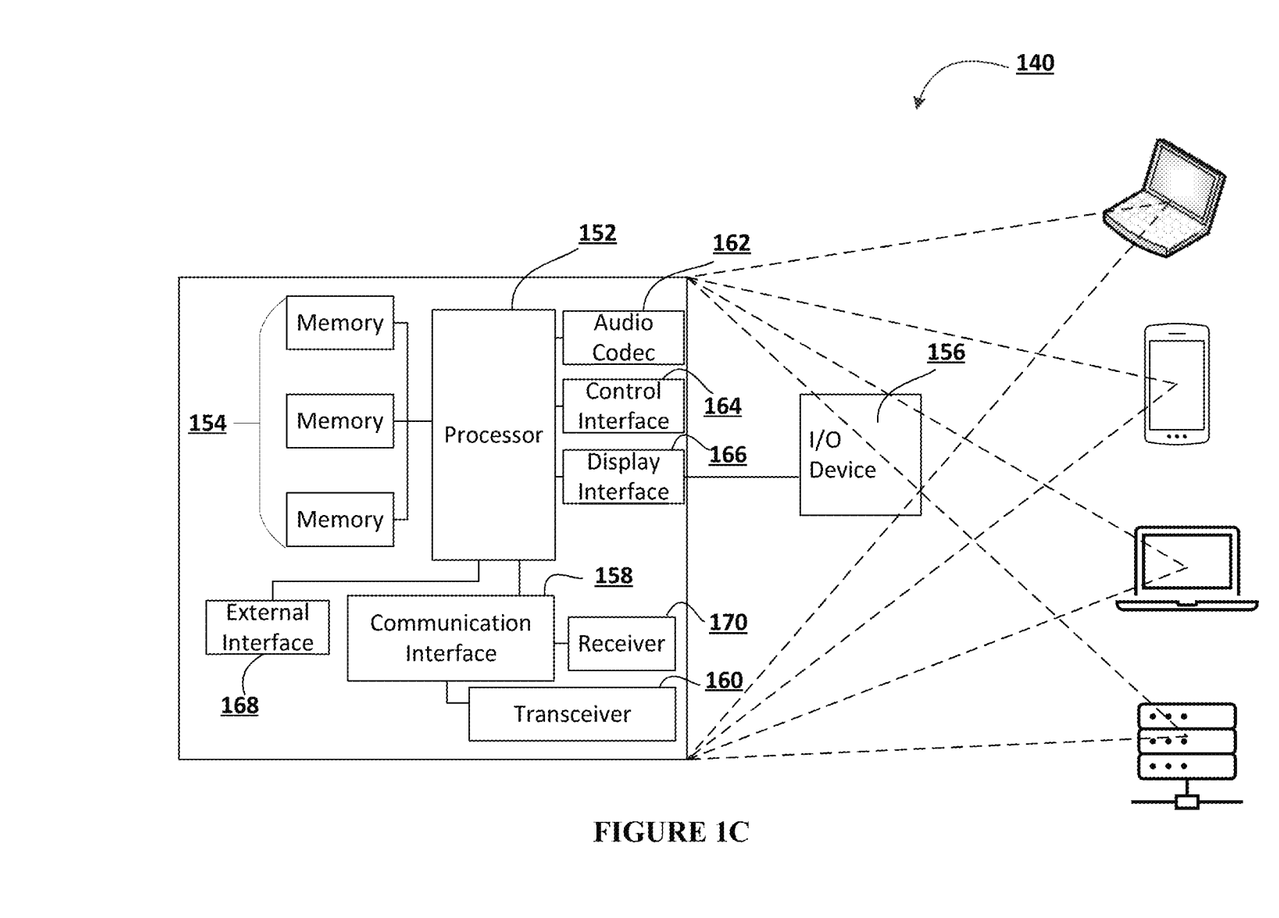

FIGS. 1A-1C illustrate technical components of an exemplary distributed computing environment for reconstructing time aware data activity across multiple software applications, in accordance with an embodiment of the disclosure. As shown in FIG. 1A, the distributed computing environment 100 contemplated herein may include a system 130 (i.e., an authentication credential verification), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
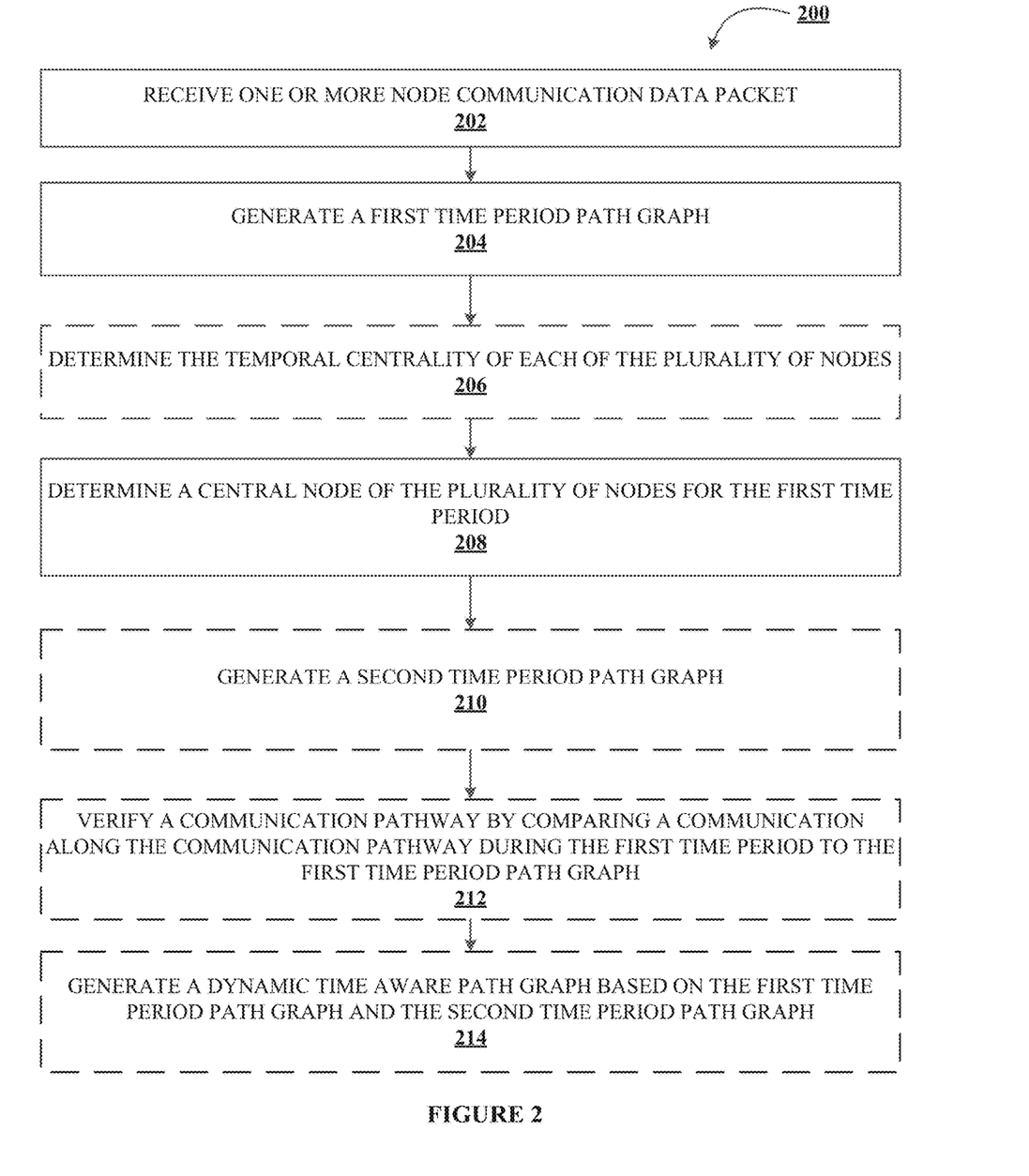
FIG. 2 illustrates a process flow for reconstructing time aware data activity across multiple software applications, in accordance with various embodiments of the present disclosure.

FIG. 2 is a flow chart 200 that illustrates another example method of reconstructing time aware data activity across multiple software applications. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes receiving one or more node communication data packets. The one or more node communication data packets include information relating to a communication between two nodes of a plurality of nodes within a network. An individual node of the network may be individual applications and/or computing devices connected to the network. Each of the one or more node communication data packets are time-stamped, such that the communication between two nodes of the plurality of nodes can be traced to a specific time period. Each of the node communication data packet(s) also includes information relating to the sending node and the receiving node of the communication.

Referring now to Block 204 of FIG. 2, the method includes generating a first time period path graph. The first time period path graph includes a directional data flow between the plurality of nodes during a first time period. The first time period may be determined based on the time-stamps of each of the one or more node communication data packets. The first time period may be a portion of the range of the time stamps provided by the one or more node communication data packets.

The first time period path graph defines a flow of data between nodes during the first time period. As such, based on the node communication data packet(s), the first time period path graph may illustrate the flow of data via arrows. As shown in FIG. 3B, at a first time period (e.g., time $t_0$), data flows between nodes A and B, from node B to node C, and from node C to node D during the time period $t_0$. As such, the first time period path graph shows the directional flow between nodes during the first time period. As the time period changes (i.e., moves from time period $t_0$ to time period $t_1$ in FIG. 3B, etc.) the nodes included and/or the direction of the flow from said nodes may also change.

The length of the first time period may be based on the number of communications included in the one or more node communication data packets. For example, in an instance in which there are many communications in the one or more node communication data packets, then the first time period may be shorter to reduce the number of communications in the first time period. Additionally or alternatively, the first time period may be based on a threshold number of communications. For example, the first time period may be a period of time in which a predetermined number of communications occur.

Referring now to optional Block 206 of FIG. 2, the method includes determining the temporal centrality of each of the plurality of nodes. The temporal centrality is based on the one or more node communication data packets. The temporal centrality is a measure of the importance of a given node in the network at a specific point in time. As such, a temporal centrality may be determined for each node of the network during the first time period (and also at additional time periods, such as the second time period, etc.). A higher temporal centrality indicates that a node is a higher priority for the directional flow of the path graph.

Then temporal centrality of the individual nodes can be compiled to create a temporal centrality for a given path. For example, the temporal centrality of each node that receives and/or sends data during the first time period may be added together to create a composite temporal centrality for the path shown in the first time period path graph. Such composite temporal centrality can be compared to the composite temporal centrality to determine a path priority. For example, a first path with a higher composite temporal centrality than a second path may indicate that the first path has a higher relative importance (e.g., the first path may be a more optimal pathway than the second path).

Referring now to Block 208 of FIG. 2, the method includes determining a central node of the plurality of nodes for the first time period. The central node of the plurality of nodes is determined based on the first time period path graph. The central node of the plurality of nodes for the first time period is based on a temporal centrality of each of the plurality of nodes. In various embodiments, the central node may be used to determine resources to be provided to the nodes (e.g., the central node may receive more resources than the other nodes). For example, an application that is represented by the central node may be more important to maintain online than a non-central node and therefore may need more oversight or review to ensure little to no downtime.

Referring now to optional Block 210 of FIG. 2, the method includes generating a second time period path graph. The second time period path graph includes a directional data flow between the plurality of nodes during a second time period. The second time period is after the first time period. The second time period path graph is generated based on the one or more node communication data packet.

The second time period path graph is generated in the same way as the first time period path graph for the second time period. As such, for example in FIG. 3B, the second time period may be the graph shown at time period $t_1$. As shown, the directional flow includes movement of data from node C to node B, from node B to node A, from node A to node D, and from node E to both node A and node D. Additional time period path graphs may also be generated (e.g., FIG. 3B illustrates time period path graphs generated for four time periods).

Referring now to optional Block 212 of FIG. 2, the method includes verifying a communication pathway by comparing a communication along the communication pathway during the first time period $t_0$ the first time period path graph. A communication pathway is the flow of data from one node to another across multiple periods of time. The communications in the communication pathway may be compared to the time period path graph for the given time period in which the communication occurs. For example, using the nodes in FIGS. 3A and 3B, the communication pathway may be from node B to node E and includes communication from node B to node A during time period $t_0$, communication from node A to node D during time period $t_1$, and communication from node D to node C during time period $t_3$, and ending with a communication from node C to node E during time period $t_4$. Each communication along the communication pathway can be compared to the individual time period path graph for the specific time period in which the communication occurs. In an instance in which such a communication does not occur, the communication pathway is not valid. An alert may be created based on determining a communication pathway is not valid. For example, if a potential communication pathway included a communication from node E to node A during time period to, then the communication pathway would be invalid, as the first time period path graph does not include a communication from node E to node A.

Additionally, as discussed above, the composite temporal centrality may be determined for each communication pathway by adding each of the temporal centralities of the nodes in the communication pathway at the time in which the communication with the node was execution. For example, a communication from node A may have a different temporal centrality during the first time period than the second time period.

Referring now to optional Block 212 of FIG. 2, the method includes generating a dynamic time aware path graph based on the first time period path graph and the second time period path graph. An example of the dynamic time aware path graph 310 is shown in FIG. 3B. As shown, the dynamic time aware path graph based on the first time period path graph and the second time period path graph includes representation of communication between at least two of the plurality of nodes during the first time period and the second time period. The dynamic time aware path graph may also include additional time periods (e.g., FIG. 3B shows an instance in which the dynamic time aware path graph includes four time periods).

Figure 3A:
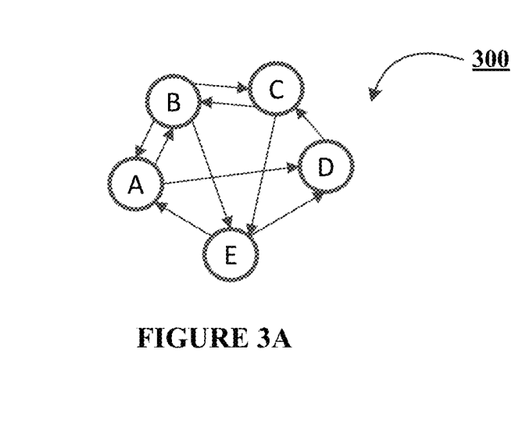
FIG. 3A is a non-time aware data graph for a plurality of nodes, in accordance with various embodiments of the present disclosure.
Figure 3B:
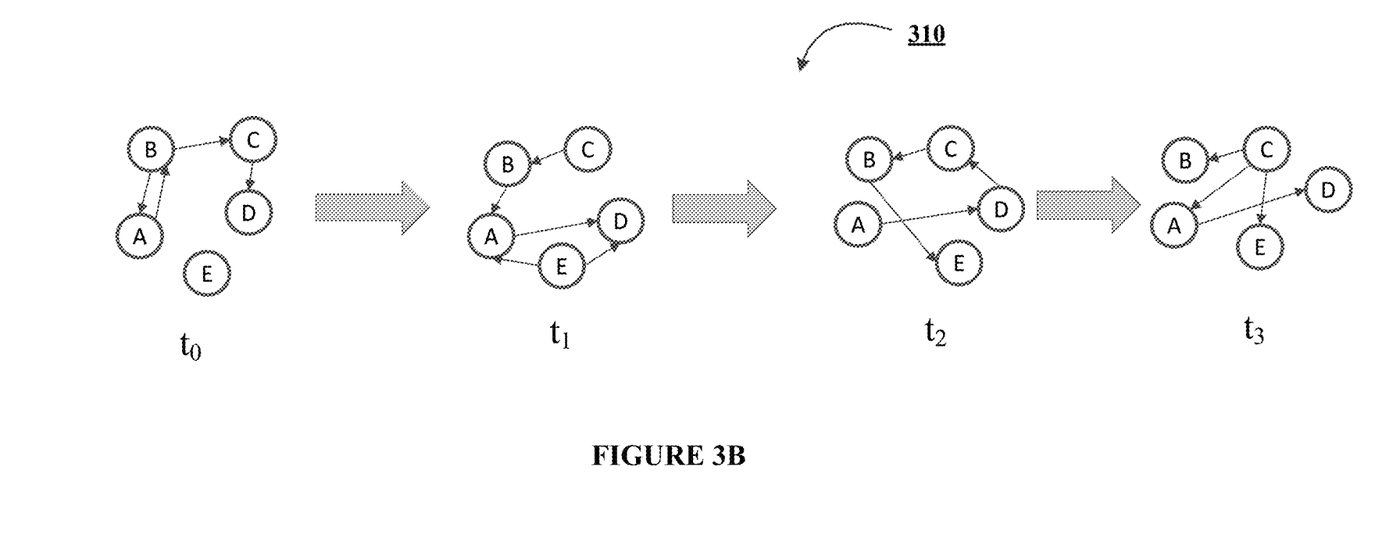
FIG. 3B is a time aware data graph for a plurality of nodes based on the non-time aware data graph shown in FIG. 3A, in accordance with various embodiments of the present disclosure.

FIG. 3A illustrates a non-time aware path graph 300, which merely illustrates all of the communications between nodes over the entire time captured. Each of the arrows indicates a communication from one node to another (e.g., the arrow is pointing at the receiving node). However, non-time aware path graphs are not helpful for pathway verification or the like since different nodes are communicating during different periods of time.

FIG. 3B illustrates the same communications shown in FIG. 3A as a dynamic time aware path graph 310 (e.g., individual time aware time period path graphs for multiple time periods). Each of the time period path graphs include the directional flow of communication between nodes during a specific time period (e.g., to includes the directional flow of communication between nodes during time period $t_0$, $t_1$ includes the directional flow of communication between nodes during time period $t_1$, $t_2$ includes the directional flow of communication between nodes during time period $t_2$, and $t_3$ includes the directional flow of communication between nodes during time period $t_3$). Each of the arrows indicates a communication from one node to another during the specific time period (e.g., the arrow is pointing at the receiving node). As discussed above in reference to the method shown in FIG. 2, the time period path graphs may be used to analyze communication pathways (e.g., confirm the communication pathway, compare communication pathways, and/or the like).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for reconstructing time aware data activity across multiple software applications, the system comprising:
   at least one non-transitory storage device; and
   at least one processing device coupled to the at least one non-transitory storage device, wherein the at least one processing device is configured to:
      receive one or more node communication data packets associated with communication between a plurality of nodes within a network, wherein each of the one or more node communication data packets are time-stamped and include two nodes of the plurality of nodes within the network;
      determine a first time period for generating a first time period path graph based on time-stamps of each of the one or more node communication data packets, wherein the first time period comprises a subset of a range of time stamps provided by the one or more node communication data packets, wherein a first time period length is based on at least one of communications from the one or more node communication data packets and a predetermined communications threshold;
      generate a first time period path graph for the first time period, wherein the first time period path graph comprises a directional data flow between the plurality of nodes during the first time period, wherein the first time period path graph is generated based on the one or more node communication data packets;
      determine a pathway validity based on each communication along a communication pathway;
      determine a path priority based on a determined composite temporal centrality, wherein the composite temporal centrality is determined for each pathway by adding each of the temporal centralities of the nodes in the pathway;
      determine a central node of the plurality of nodes for the first time period, wherein the central node of the plurality of nodes is determined based on the first time period path graph, wherein the central node has priority over the other nodes of the plurality of nodes for staying online; and
      dynamically adjust resources provided to the plurality of nodes based on the central node of the plurality of nodes, wherein the central node is provided more resources than other nodes.

2. The system of claim 1, wherein the central node of the plurality of nodes for the first time period is based on a temporal centrality of each of the plurality of nodes.

3. The system of claim 2, wherein the at least one processing device is configured to determine the temporal centrality of each of the plurality of nodes, wherein the temporal centrality is based on the one or more node communication data packets.

4. The system of claim 1, wherein the at least one processing device is configured to generate a second time period path graph, wherein the second time period path graph comprises a directional data flow between the plurality of nodes during a second time period, wherein the second time period is after the first time period, and wherein the second time period path graph is generated based on the one or more node communication data packets.

5. The system of claim 1, wherein the at least one processing device is configured to verify a communication pathway by comparing a communication along the communication pathway during the first time period to the first time period path graph.

6. The system of claim 4, wherein the at least one processing device is configured to generate a dynamic time aware path graph based on the first time period path graph and the second time period path graph.

7. The system of claim 6, wherein the dynamic time aware path graph based on the first time period path graph and the second time period path graph comprises representation of communication between at least two of the plurality of nodes during the first time period and the second time period.

8. A computer program product for reconstructing time aware data activity across multiple software applications, the computer program product comprising at least one non-transitory computer-readable medium having computer-readable program code portions embodied therein, the computer-readable program code portions comprising one or more executable portions configured to:
   receive one or more node communication data packets associated with communication between a plurality of nodes within a network, wherein each of the one or more node communication data packets are time-stamped and include two nodes of the plurality of nodes within the network;
   determine a first time period for generating a first time period path graph based on time-stamps of each of the one or more node communication data packets, wherein the first time period comprises a subset of a range of time stamps provided by the one or more node communication data packets, wherein a first time period length is based on at least one of communications from the one or more node communication data packets and a predetermined communications threshold;

generate a first time period path graph for the first time period, wherein the first time period path graph comprises a directional data flow between the plurality of nodes during the first time period, wherein the first time period path graph is generated based on the one or more node communication data packets;

determine a pathway validity based on each communication along a communication pathway;

determine a path priority based on a determined composite temporal centrality, wherein the composite temporal centrality is determined for each pathway by adding each of the temporal centralities of the nodes in the pathway;

determine a central node of the plurality of nodes for the first time period, wherein the central node of the plurality of nodes is determined based on the first time period path graph, wherein the central node has priority over the other nodes of the plurality of nodes for staying online; and dynamically adjust resources provided to the plurality of nodes based on the central node of the plurality of nodes, wherein the central node is provided more resources than other nodes.

9. The computer program product of claim 8, wherein the central node of the plurality of nodes for the first time period is based on a temporal centrality of each of the plurality of nodes.

10. The computer program product of claim 9, wherein the computer program product comprising one or more executable portions further configured to determine the temporal centrality of each of the plurality of nodes, wherein the temporal centrality is based on the one or more node communication data packets.

11. The computer program product of claim 8, wherein the computer program product comprising one or more executable portions further configured to generate a second time period path graph, wherein the second time period path graph comprises a directional data flow between the plurality of nodes during a second time period, wherein the second time period is after the first time period, and wherein the second time period path graph is generated based on the one or more node communication data packets.

12. The computer program product of claim 8, wherein the computer program product comprising one or more executable portions further configured to verify a communication pathway by comparing a communication along the communication pathway during the first time period to the first time period path graph.

13. The computer program product of claim 11, wherein the computer program product comprising one or more executable portions configured to generate a dynamic time aware path graph based on the first time period path graph and the second time period path graph.

14. The computer program product of claim 13, wherein the dynamic time aware path graph based on the first time period path graph and the second time period path graph comprises representation of communication between at least two of the plurality of nodes during the first time period and the second time period.

15. A computer-implemented method for reconstructing time aware data activity across multiple software applications, the method comprising:

receiving one or more node communication data packets associated with communication between a plurality of nodes within a network, wherein each of the one or more node communication data packets are time-stamped and include two nodes of the plurality of nodes within the network;

determining a first time period for generating a first time period path graph based on time-stamps of each of the one or more node communication data packets, wherein the first time period comprises a subset of a range of time stamps provided by the one or more node communication data packets, wherein a first time period length is based on at least one of communications from the one or more node communication data packets and a predetermined communications threshold;

generating a first time period path graph for the first time period, wherein the first time period path graph comprises a directional data flow between the plurality of nodes during the first time period, wherein the first time period path graph is generated based on the one or more node communication data packets;

determining a pathway validity based on each communication along a communication pathway;

determining a path priority based on a determined composite temporal centrality, wherein the composite temporal centrality is determined for each pathway by adding each of the temporal centralities of the nodes in the pathway;

determining a central node of the plurality of nodes for the first time period, wherein the central node of the plurality of nodes is determined based on the first time period path graph, wherein the central node has priority over the other nodes of the plurality of nodes for staying online; and dynamically adjusting resources provided to the plurality of nodes based on the central node of the plurality of nodes, wherein the central node is provided more resources than other nodes.

16. The method of claim 15, wherein the central node of the plurality of nodes for the first time period is based on a temporal centrality of each of the plurality of nodes.

17. The method of claim 16, further comprising determining the temporal centrality of each of the plurality of nodes, wherein the temporal centrality is based on the one or more node communication data packets.

18. The method of claim 15, further comprising generating a second time period path graph, wherein the second time period path graph comprises a directional data flow between the plurality of nodes during a second time period, wherein the second time period is after the first time period, and wherein the second time period path graph is generated based on the one or more node communication data packets.

19. The method of claim 15, further comprising verifying a communication pathway by comparing a communication along the communication pathway during the first time period to the first time period path graph.

20. The method of claim 18, further comprising generating a dynamic time aware path graph based on the first time period path graph and the second time period path graph.

* * * * *